(12) United States Patent
Han et al.

(10) Patent No.: US 12,195,090 B2
(45) Date of Patent: Jan. 14, 2025

(54) FRONT PILLAR STRUCTURE OF VEHICLE

(71) Applicants:Hyundai Motor Company, Seoul (KR); Kia Corporation, Seoul (KR)

(72) Inventors: Yoonkyoung Han, Suwon-si (KR); Heedae Oh, Suwon-si (KR); Jung Jong Chun, Seoul (KR); Joonghyun Shin, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 317 days.

(21) Appl. No.: 17/963,793

(22) Filed: Oct. 11, 2022

(65) Prior Publication Data

US 2023/0382461 A1 Nov. 30, 2023

(30) Foreign Application Priority Data

May 31, 2022 (KR) .......................... 10-2022-0067211

(51) Int. Cl.
 *B62D 25/04* (2006.01)
(52) U.S. Cl.
 CPC ................................... *B62D 25/04* (2013.01)

(58) Field of Classification Search
 CPC . B62D 25/04; B62D 27/02; B60S 1/62; B60S 1/48; B60Y 2306/09; B60Y 2410/125
 See application file for complete search history.

(56) References Cited

U.S. PATENT DOCUMENTS

2008/0143147 A1* 6/2008 Lee ...................... B62D 27/023
 296/193.06

OTHER PUBLICATIONS

KR 19980033824 U with English translation (Year: 1998).*
CN 110730746 A with English translation (Year: 2020).*

* cited by examiner

*Primary Examiner* — Lori Lyjak
(74) *Attorney, Agent, or Firm* — Slater Matsil, LLP (57) ABSTRACT

An embodiment front pillar structure of a vehicle configured to mount a flexible component part having a preset length includes a side outer reinforce assembly, a guide pipe fixed to the side outer reinforce assembly, the guide pipe having open ends such that the flexible component part may enter in and be drawn out from the guide pipe, and a side inner panel assembly coupled to the side outer reinforce assembly interposing the guide pipe, the side inner panel assembly including an entering hole and a draw out hole that are connected to the open ends of the guide pipe, respectively.

20 Claims, 8 Drawing Sheets

FRONT PILLAR STRUCTURE OF VEHICLE

CROSS-REFERENCE TO RELATED APPLICATIONS

This application claims the benefit of Korean Patent Application No. 10-2022-0067211, filed on May 31, 2022, which application is hereby incorporated herein by reference.

TECHNICAL FIELD

The present disclosure relates to a vehicle body.

BACKGROUND

Recently, the vehicle industry has introduced a new concept of future mobility visions for realizing a human-centered dynamic future city. One of these future mobility solutions is a PBV (purpose-built vehicle) as a purpose-based mobility.

An electric vehicle (EV)-based environment-friendly mobile vehicle may be an example of the PBV. Furthermore, the PBV may provide users with a variety of customized services during the time of traveling to a destination on the ground through artificial intelligence and autonomous driving methods.

Meanwhile, in the PBV moving through the autonomous driving method, flexible component parts having preset lengths such as various hoses, tubes, and wiring, are mounted inside the vehicle body.

One example of such a flexible component part may be a sensor cleaning hose configured to clean a sensor (e.g., a lidar sensor) installed on a roof of a vehicle. The sensor cleaning hose interconnects a washer liquid reservoir tank provided in the vehicle and a washer liquid spray nozzle fixed to the roof.

For example, the sensor cleaning hose is required to be mounted inside a pillar trim that covers a pillar panel.

However, in the case that the sensor cleaning hose is mounted together with component parts such as various wiring and curtain airbags disposed inside the pillar trim, an increase of a cross-section of the pillar trim is expected to secure a mounting space of the sensor cleaning hose, which is disadvantageous from the point of a driver's view.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a vehicle body. Particular embodiments relate to a front pillar structure of a vehicle configured to mount a flexible component part having a preset length.

Embodiments of the present disclosure provide a front pillar structure capable of mounting a flexible component part such as a sensor cleaning hose in a cross-section of a pillar without an increase of a pillar cross-section.

An exemplary front pillar structure of a vehicle is configured to mount a flexible component part having a preset length, and the front pillar structure includes a side outer reinforce assembly, a guide pipe fixed to the side outer reinforce assembly, and formed both ends open such that the flexible component part may enter and be drawn out, and a side inner panel assembly coupled to the side outer reinforce assembly interposing the guide pipe and including an entering hole and a draw out hole that are connected to respective open ends of the guide pipe.

It may further include an at least one mounting bracket coupled to the guide pipe and fixed to the side outer reinforce assembly and the side inner panel assembly.

The side outer reinforce assembly may include a front pillar outer reinforce member coupled to the at least one mounting bracket and a side outer reinforce member coupled to an interior surface of the front pillar outer reinforce member and configured to install the guide pipe.

The side inner panel assembly may include a front pillar inner panel coupled to the at least one mounting bracket and to a front pillar outer reinforce member of the side outer reinforce assembly and a side inner panel coupled to the front pillar inner panel and the front pillar outer reinforce member.

The entering hole is formed on the front pillar inner panel.

The draw out hole is formed on the side inner panel.

The at least one mounting bracket may include a first portion coupled to the guide pipe and a second portion extended from upper and lower sides of the first portion and coupled to the front pillar outer reinforce member and the front pillar inner panel.

The guide pipe may include a straight range portion, and a first bent range portion and a second bent range portion connected to respective sides of the straight range portion.

The first bent range portion may include a first open end connected to the entering hole.

The second bent range portion may include a second open end connected to the draw out hole.

The side outer reinforce assembly may include a front pillar outer reinforce member and a side outer reinforce member coupled to an interior surface of the front pillar outer reinforce member and joined with the guide pipe.

The side inner panel assembly may include a front pillar inner panel coupled to the front pillar outer reinforce member and a side inner panel coupled to the front pillar inner panel and the front pillar outer reinforce member.

It may further include a foam pad layer applied to an exterior surface of the guide pipe.

The flexible component part may include a sensor cleaning hose configured to flow a washer liquid to clean a sensor installed in a roof of a vehicle.

According to an exemplary embodiment, the sensor cleaning hose may be mounted by using the guide pipe disposed inside a cross-section of a pillar without causing an increase of a pillar cross-section, and service, e.g., repair and replacement, of the sensor cleaning hose may become easy.

Other effects that may be obtained or are predicted by exemplary embodiments will be explicitly or implicitly described in a detailed description of embodiments of the present invention. That is, various effects that are predicted according to exemplary embodiments will be described in the following detailed description.

BRIEF DESCRIPTION OF THE DRAWINGS

The drawings are intended to be used as references for describing the exemplary embodiments of the present disclosure, and the accompanying drawings should not be construed as limiting the technical spirit of the present invention.

It should be understood that the above-referenced drawings are not necessarily to scale, presenting a somewhat simplified representation of various preferred features illustrative of the basic principles of embodiments of the disclosure. The specific design features of embodiments of the present disclosure, including, for example, specific dimensions, orientations, locations, and shapes, will be determined in part by the particular intended application and use environment.

The following reference identifiers may be used in connection with the accompanying drawings to describe exemplary embodiments of the present disclosure.

| | |
|---|---|
| 1: flexible component part | 3: sensor cleaning hose |
| 4: washer liquid spray nozzle | 5: washer liquid |
| 6: roof structure | 7: sensor device |
| 10: side outer reinforce assembly | 110: side outer reinforce assembly |
| 11: front pillar outer reinforce member | 111: front pillar outer reinforce member |
| 13: side outer panel | 113: side outer panel |
| 15: first joint portion | 17: second joint portion |
| 21: side outer reinforce member | 121: side outer reinforce member |
| 23, 123: mounting space | 30, 130: guide pipe |
| 31: straight range portion | 33: first bent range portion |
| 34: first open end | 35: second bent range portion |
| 36: second open end | 50: mounting bracket |
| 51: first portion | 52: second portion |
| 70, 170: side inner panel assembly | 71: entering hole |
| 73: draw out hole | 75, 175: front pillar inner panel |
| 77, 177: side inner panel | 81: third joint portion |
| 83: fourth joint portion | 90: foam pad layer |
| 100, 200: front pillar structure | 139: welding portion |

DETAILED DESCRIPTION OF ILLUSTRATIVE EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the present invention. As used herein, the singular forms are intended to include the plural forms as well, unless the context clearly indicates otherwise.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items. The term "coupled" denotes a physical relationship between two components in which components are directly connected to each other or indirectly connected through one or more intermediary components, by welding, self-piercing rivet (SPR), structural adhesive, and the like.

It is understood that the term "vehicle," "vehicular," "car," or other similar term as used herein is inclusive of, in general, passenger automobiles including sports cars, sport utility vehicles (SUVs), buses, trucks, various commercial vehicles, and inclusive of hybrid vehicles, electric vehicles, hybrid electric vehicles, hydrogen-powered vehicles, purpose-built vehicles (PBVs), and other alternative fuel vehicles (e.g., fuels derived from resources other than petroleum).

Hereinafter, embodiments of the present disclosure are described in detail with reference to the accompanying drawings.

Figure 1:
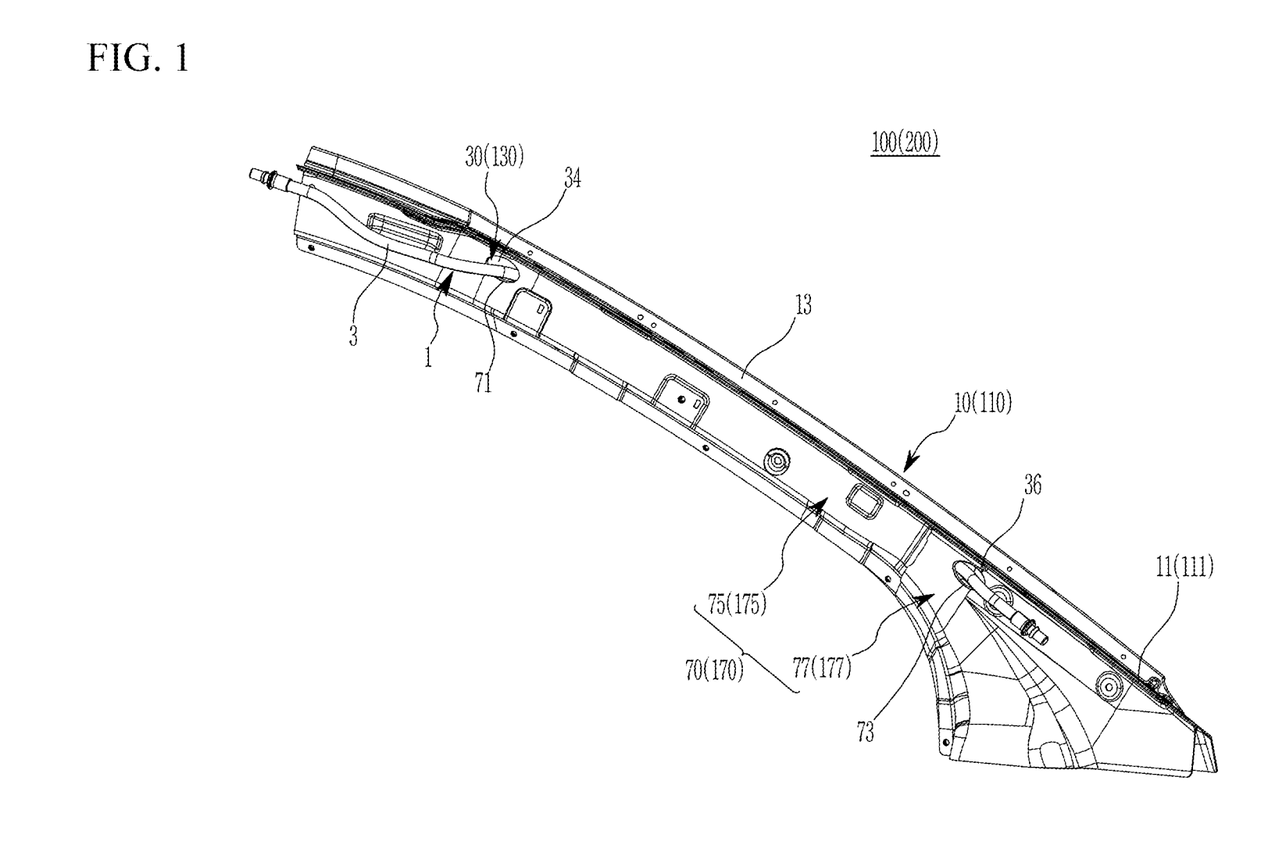
FIG. 1 is an assembled perspective view showing a front pillar structure according to an exemplary embodiment.

FIG. 1 is an assembled perspective view showing a front pillar structure according to an exemplary embodiment.

Referring to FIG. 1, a front pillar structure 100 according to an exemplary embodiment may be applied to a vehicle body of, for example, an autonomous driving vehicle. Furthermore, the front pillar structure 100 according to an exemplary embodiment may be applied to a vehicle body of a purpose-built mobility vehicle (hereinafter called a PBV).

In an example, the PBV may be utilized as an electric vehicle-based module vehicle configured to provide various services to occupants while travelling to a destination in an autonomous driving method. The above-described life module vehicle is also frequently referred to as a robo-taxi, a robo-shuttle, or a hailing vehicle by those skilled in the art.

A flexible component part 1 having a preset length is mounted on a vehicle body of an autonomous driving vehicle such as the PBV. In an example, the flexible component part 1 may include a sensor cleaning hose 3.

Figure 2:
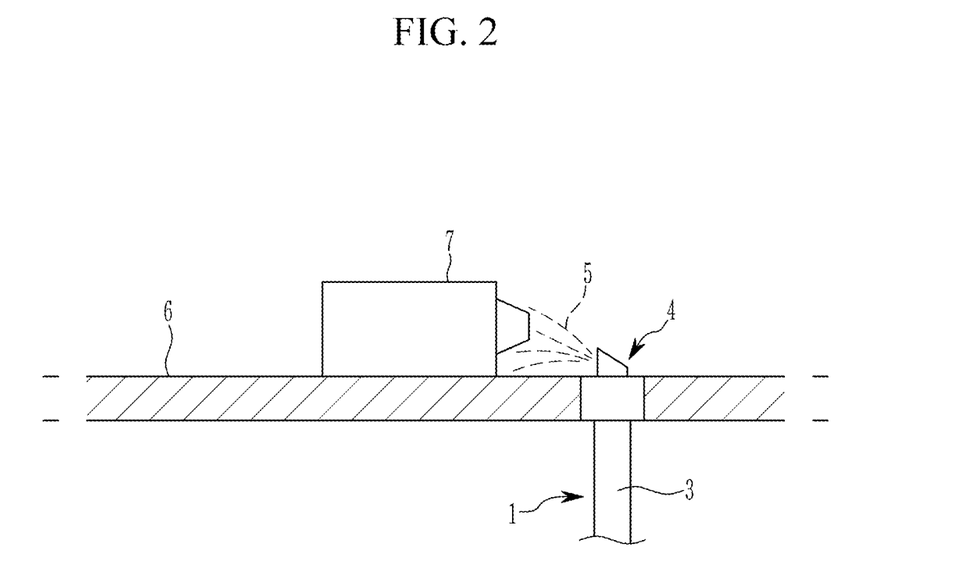
FIG. 2 schematically illustrates an application example of a sensor cleaning hose applied to a front pillar structure according to an exemplary embodiment.

As shown in FIG. 2, the sensor cleaning hose 3 is configured to spray a washer liquid 5 to at least one sensor device 7 mounted on a roof structure 6 of a vehicle body, such that the at least one sensor device 7 is cleaned by the washer liquid 5. In an example, the at least one sensor device 7 may include a lidar sensor.

Here, the sensor cleaning hose 3 may be connected to a washer liquid spray nozzle 4 fixed to the roof structure 6 and to a washer liquid reservoir tank (not shown) provided in the vehicle. The washer liquid 5 supplied from the washer liquid reservoir tank may flow to the washer liquid spray nozzle 4 through the sensor cleaning hose 3.

Although the sensor cleaning hose 3 is taken as an example of the flexible component part 1, the flexible component part 1 is not limited thereto. Alternatively, the flexible component part 1 may include various kinds of flexible component parts, such as various tubes and wiring, known to those skilled in the art.

In this disclosure, with reference to the vehicle body, a vehicle body back-and-forth direction (i.e., a vehicle body length direction or longitudinal direction), a vehicle width direction (i.e., a vehicle body transverse or lateral direction), and a vertical direction (i.e., a height direction) may be taken as reference directions in describing constituent elements.

Furthermore, in this specification, "upper end portion", "upper portion", "upper end", or "upper portion surface" of a component indicates an end portion, portion, end, or surface of the component that is relatively positioned higher in the drawing, and "lower end portion", "lower portion", "lower end", or "lower portion surface" of a component indicates an end portion, portion, end, or surface of the component that is relatively positioned lower in the drawing.

In addition, in this specification, "end" (for example, one end, another end, or the like) of a component indicates an end of the component in any direction, and "end portion" (for example, one end portion, another end portion, or the like) of a component indicates a certain part of the component including the end.

According to the front pillar structure 100 according to an exemplary embodiment, the sensor cleaning hose 3 is installed inside a pillar cross-section, without an increase of the pillar cross-section.

In addition, the front pillar structure 100 according to an exemplary embodiment is structured to enable easiness of a service, e.g., repair and replacement, of the sensor cleaning hose 3.

Figure 3:
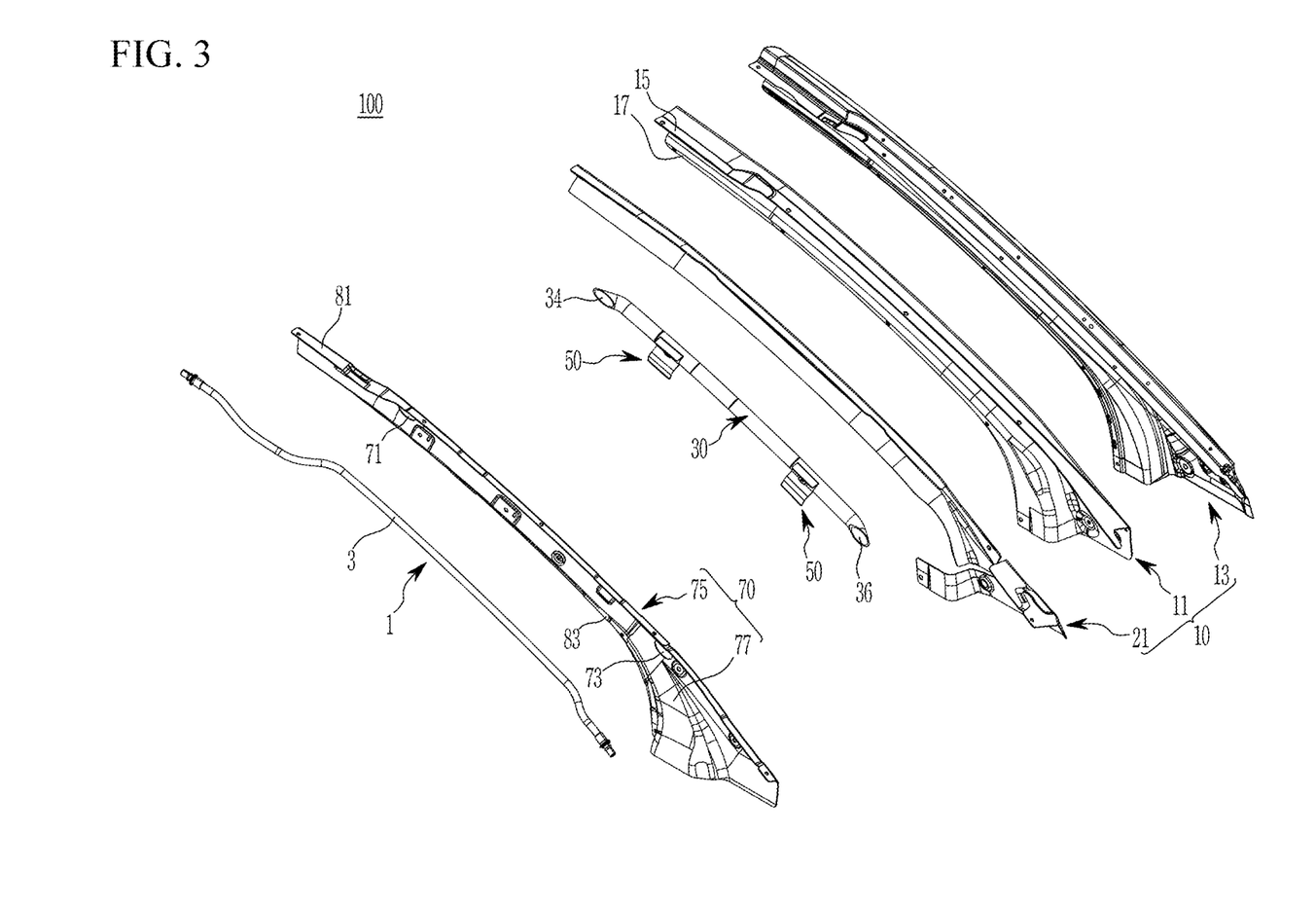
FIG. 3 is an exploded perspective view showing a front pillar structure according to an exemplary embodiment.
Figure 4:
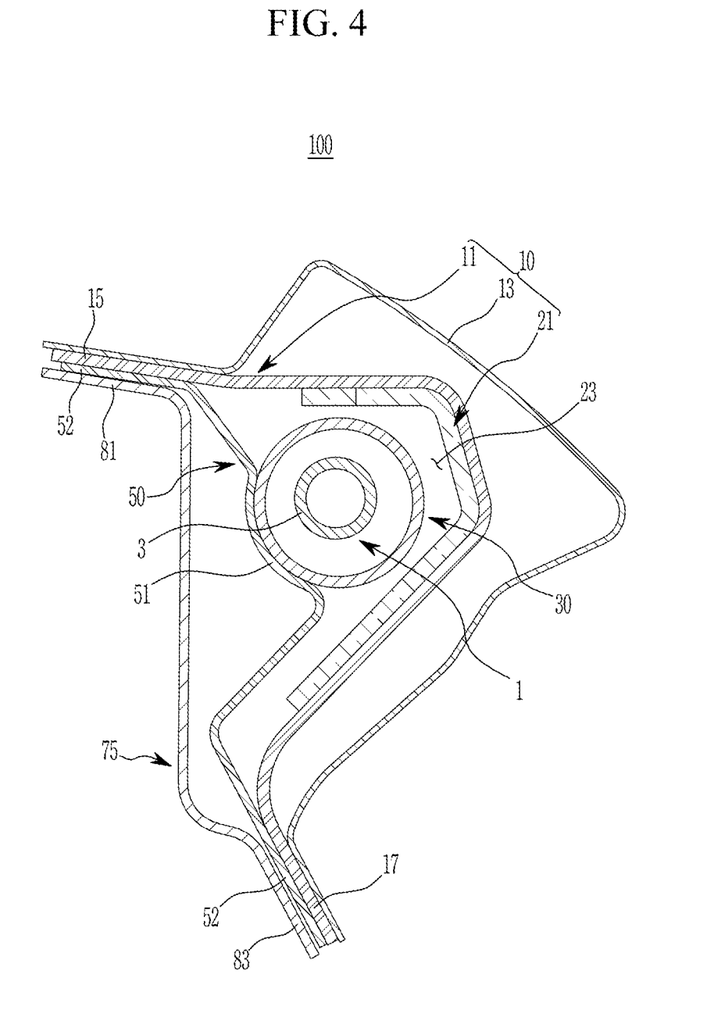
FIG. 4 is a cross-sectional view showing a front pillar structure according to an exemplary embodiment.

FIG. 3 is an exploded perspective view showing a front pillar structure according to an exemplary embodiment. FIG. 4 is a cross-sectional view showing a front pillar structure according to an exemplary embodiment.

Referring to FIG. 1, FIG. 3, and FIG. 4, the front pillar structure 100 according to an exemplary embodiment includes a side outer reinforce assembly 10, a guide pipe 30, an at least one mounting bracket 50, and a side inner panel assembly 70.

In an exemplary embodiment, the side outer reinforce assembly 10 is a side outer assembly of the front pillar structure 100 disposed along the vehicle body length direction. The side outer reinforce assembly 10 includes a front pillar outer reinforce member 11 and a side outer reinforce member 21.

A side outer panel 13 is coupled (e.g., welded) to an exterior surface of the front pillar outer reinforce member 11. The front pillar outer reinforce member 11 comprises a first joint portion 15 formed in an upper portion along the vehicle body length direction and a second joint portion 17 formed in a lower portion along the vehicle body length direction.

The side outer reinforce member 21 is coupled (e.g., welded) to an interior surface of the front pillar outer reinforce member 11. Here, the side outer reinforce member 21 is configured to form a mounting space 23 by being bent toward the interior surface of the front pillar outer reinforce member 11.

Referring to FIG. 1, FIG. 3 and FIG. 4, in an exemplary embodiment, the guide pipe 30 is configured to guide the sensor cleaning hose 3 along the vehicle body length direction. The guide pipe 30 may be formed as a hollow pipe of a circular cross-section with both ends open such that the sensor cleaning hose 3 may enter and be drawn out.

The guide pipe 30 may be fixed to the side outer reinforce assembly 10 through the at least one mounting bracket 50 and the side inner panel assembly 70 that will be further described later.

Here, the guide pipe 30 is installed in the side outer reinforce assembly 10, and in detail, the guide pipe 30 is disposed in the mounting space 23 of the side outer reinforce member 21 along the vehicle body length direction.

Figure 5:
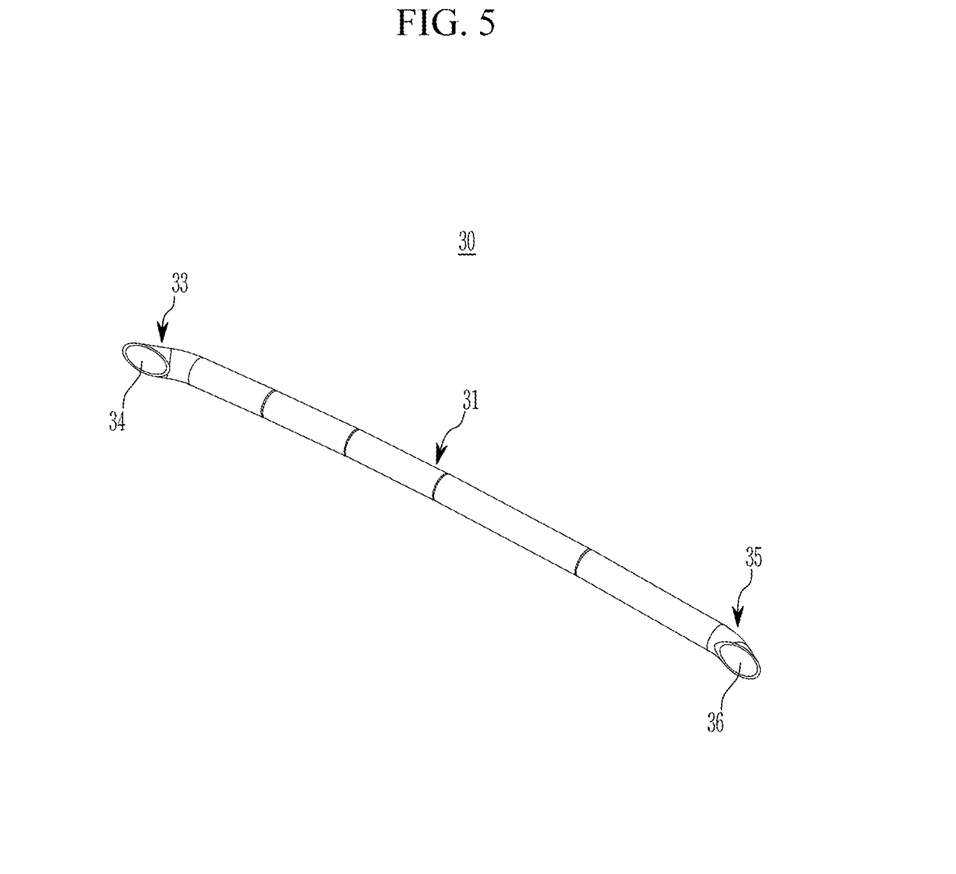
FIG. 5 illustrates a guide pipe applied to a front pillar structure according to an exemplary embodiment.

As shown in FIG. 5, the guide pipe 30 comprises a straight range portion 31 and a first bent range portion 33 and a second bent range portion 35 that are connected to respective sides of the straight range portion 31.

The straight range portion 31 is integrally formed with the first bent range portion 33 and the second bent range portion 35. The first bent range portion 33 forms a first open end 34 that is open in a direction opposite to an interior surface of the side outer reinforce member 21. In addition, the second bent range portion 35 forms a second open end 36 that is open in the direction opposite to the interior surface of the side outer reinforce member 21.

Referring to FIG. 1, FIG. 3 and FIG. 4, in an exemplary embodiment, the at least one mounting bracket 50 is configured to mount the guide pipe 30 to the mounting space 23 of the side outer reinforce member 21.

The at least one mounting bracket 50 is coupled to the guide pipe 30, fixed to the side outer reinforce assembly 10, and fixed to the side inner panel assembly 70 that will be further described later.

Here, the at least one mounting bracket 50 is coupled to the front pillar outer reinforce member 11 of the side outer reinforce assembly 10.

Figure 6:
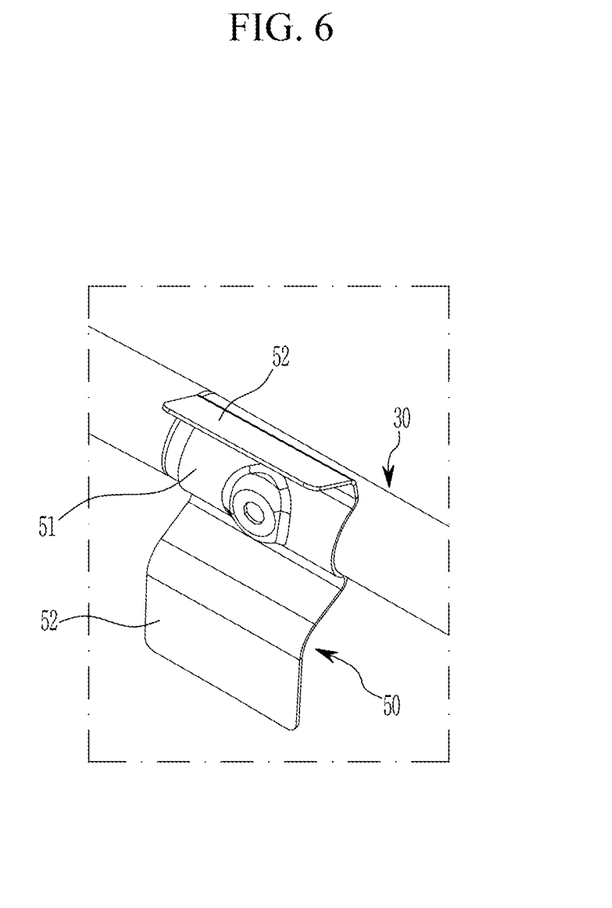
FIG. 6 illustrates a mounting bracket applied to a front pillar structure according to an exemplary embodiment.

As shown in FIG. 6, the at least one mounting bracket 50 comprises a first portion 51 and a second portion 52.

The first portion 51 is coupled (e.g., welded) to an exterior circumferential surface of the guide pipe 30. The second portion 52 is extended from upper and lower sides of the first portion 51 and coupled to the front pillar outer reinforce member 11.

Furthermore, the first portion 51 may be formed by being bent to a shape (e.g., a round shape) corresponding to the exterior circumferential surface of the guide pipe 30. In addition, the second portion 52 is joined (e.g., welded) to the first joint portion 15 and the second joint portion 17 of the front pillar outer reinforce member 11, respectively.

Referring to FIG. 1, FIG. 3 and FIG. 4, in an exemplary embodiment, the side inner panel assembly 70 is a side inner assembly of the front pillar structure 100 disposed along the vehicle body length direction.

The side inner panel assembly 70 is coupled to the side outer reinforce assembly 10 interposing the guide pipe 30. In addition, the side inner panel assembly 70 includes an entering hole 71 and a draw out hole 73 that are respectively connected to the first open end 34 and the second open end 36 of the guide pipe 30 shown in FIG. 5.

The side inner panel assembly 70 includes a front pillar inner panel 75 and a side inner panel 77.

The front pillar inner panel 75 is coupled (e.g., welded) to the at least one mounting bracket 50 and the front pillar outer reinforce member 11. The front pillar inner panel 75 includes a third joint portion 81 formed in an upper portion along the vehicle body length direction and a fourth joint portion 83 formed in a lower portion along the vehicle body length direction.

Here, the third joint portion 81 is joined (e.g., welded) to the second portion 52 of the at least one mounting bracket 50 and to the first joint portion 15 of the front pillar outer reinforce member 11. In addition, the fourth joint portion 83 is joined (e.g., welded) to the second portion 52 of the at least one mounting bracket 50 and to the second joint portion 17 of the front pillar outer reinforce member 11.

In addition, the above-mentioned entering hole 71 is formed on the front pillar inner panel 75. The entering hole 71 is connected to the first open end 34 of the first bent range portion 33 of the guide pipe 30 shown in FIG. 5.

The side inner panel 77 is coupled to a front portion of the front pillar inner panel 75 and coupled to the front pillar outer reinforce member 11.

Here, the side inner panel 77 is joined (e.g., welded) to the first joint portion 15 and the second joint portion 17 of the front pillar outer reinforce member 11. In addition, the side inner panel 77 may be connected to a crash pad (not shown) of a vehicle body front portion.

The above-mentioned draw out hole 73 is formed on the side inner panel 77. The draw out hole 73 is connected to the second open end 36 of the second bent range portion 35 of the guide pipe 30 shown in FIG. 5.

Figure 7:
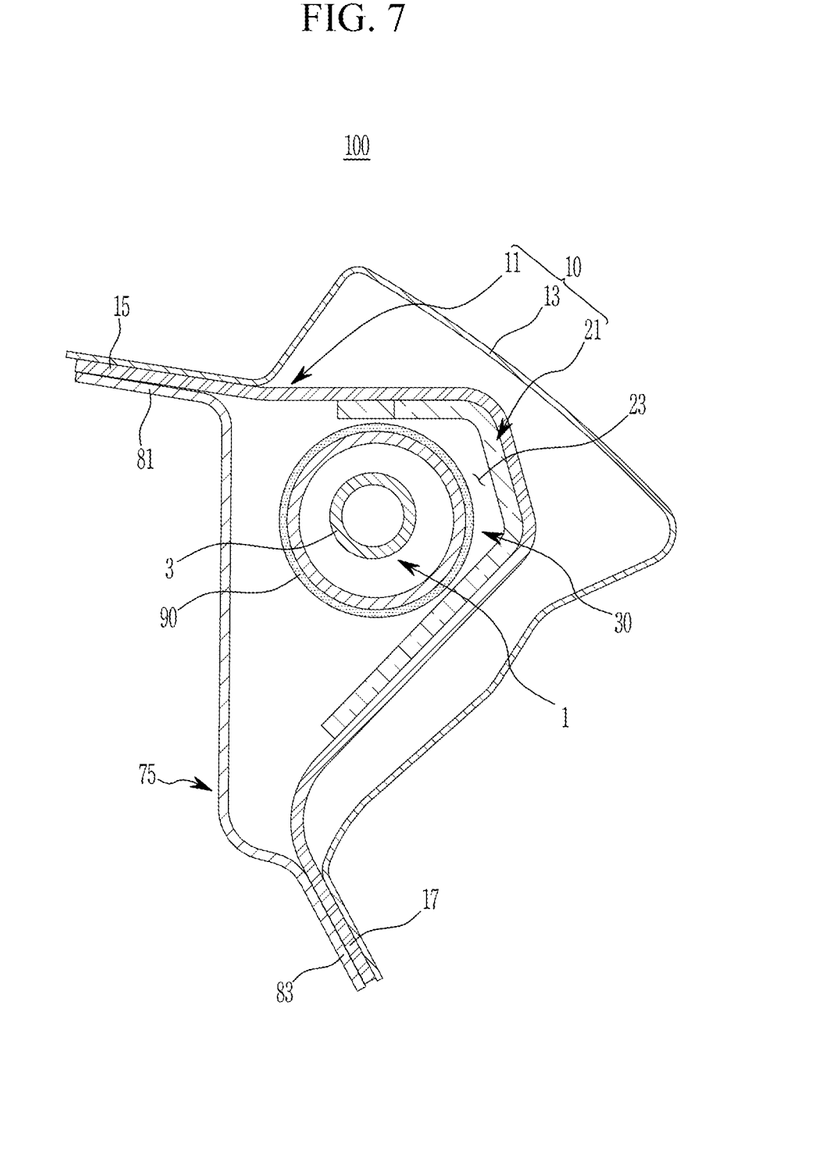
FIG. 7 illustrates a foam pad layer area applied to a front pillar structure according to an exemplary embodiment.

Meanwhile, as shown in FIG. 7, the front pillar structure 100 according to an exemplary embodiment further includes a foam pad layer 90 applied to an exterior surface of the guide pipe 30.

The foam pad layer 90 may be a heated foam pad known to those skilled in the art and is configured to prevent generation contact noise between the guide pipe 30 and the interior surface of the side outer reinforce member 21 in the mounting space 23 of the side outer reinforce member 21.

Hereinafter, an assembly process and operation of the front pillar structure 100 according to an exemplary embodiment is described in detail with reference to FIG. 1 to FIG. 7.

First, the side outer reinforce assembly 10, in which the front pillar outer reinforce member 11, the side outer panel 13, and the side outer reinforce member 21 are joined with each other in the vehicle width direction, is provided.

In addition, the guide pipe 30 to which the first portion 51 of the at least one mounting bracket 50 is joined is provided. In addition, the side inner panel assembly 70, in which the front pillar inner panel 75 and the side inner panel 77 are joined with each other in the vehicle body length direction, is provided.

In such a state, the guide pipe 30 is placed in the mounting space 23 of the side outer reinforce member 21, and the second portion 52 of the at least one mounting bracket 50 is joined to the first joint portion 15 and the second joint portion 17 of the front pillar outer reinforce member 11, respectively.

Then, the front pillar inner panel 75 and the side inner panel 77 are joined to the first joint portion 15 and the second joint portion 17 of the front pillar outer reinforce member 11, interposing the guide pipe 30.

Here, the front pillar inner panel 75 is joined to the second portion 52 of the at least one mounting bracket 50 and the first and second joint portions 15 and 17 of the front pillar outer reinforce member 11 through the third joint portion 81 and the fourth joint portion 83.

Therefore, in the mounting space 23 of the side outer reinforce member 21, the guide pipe 30 may be fixed to the side outer reinforce assembly 10 and the side inner panel assembly 70 through the at least one mounting bracket 50.

Here, the first open end 34 of the first bent range portion 33 of the guide pipe 30 is connected to the entering hole 71 of the front pillar inner panel 75. In addition, the second open end 36 of the second bent range portion 35 of the guide pipe 30 is connected to the draw out hole 73 of the side inner panel 77.

Thereby, the sensor cleaning hose 3 may be mounted to the guide pipe 30, by being drawn into the guide pipe 30 through the entering hole 71 and drawn out through the draw out hole 73.

According to the front pillar structure 100 according to an exemplary embodiment described above, the sensor cleaning hose 3 may be mounted by using the guide pipe 30 disposed inside a cross-section of a pillar without causing an increase of the pillar cross-section, and service, e.g., repair and replacement, of the sensor cleaning hose 3 may become easy.

In addition, according to the front pillar structure 100 according to an exemplary embodiment, the foam pad layer 90 is formed on the exterior surface of the guide pipe 30, and thereby the NVH performance of the vehicle body may be improved.

Figure 8:
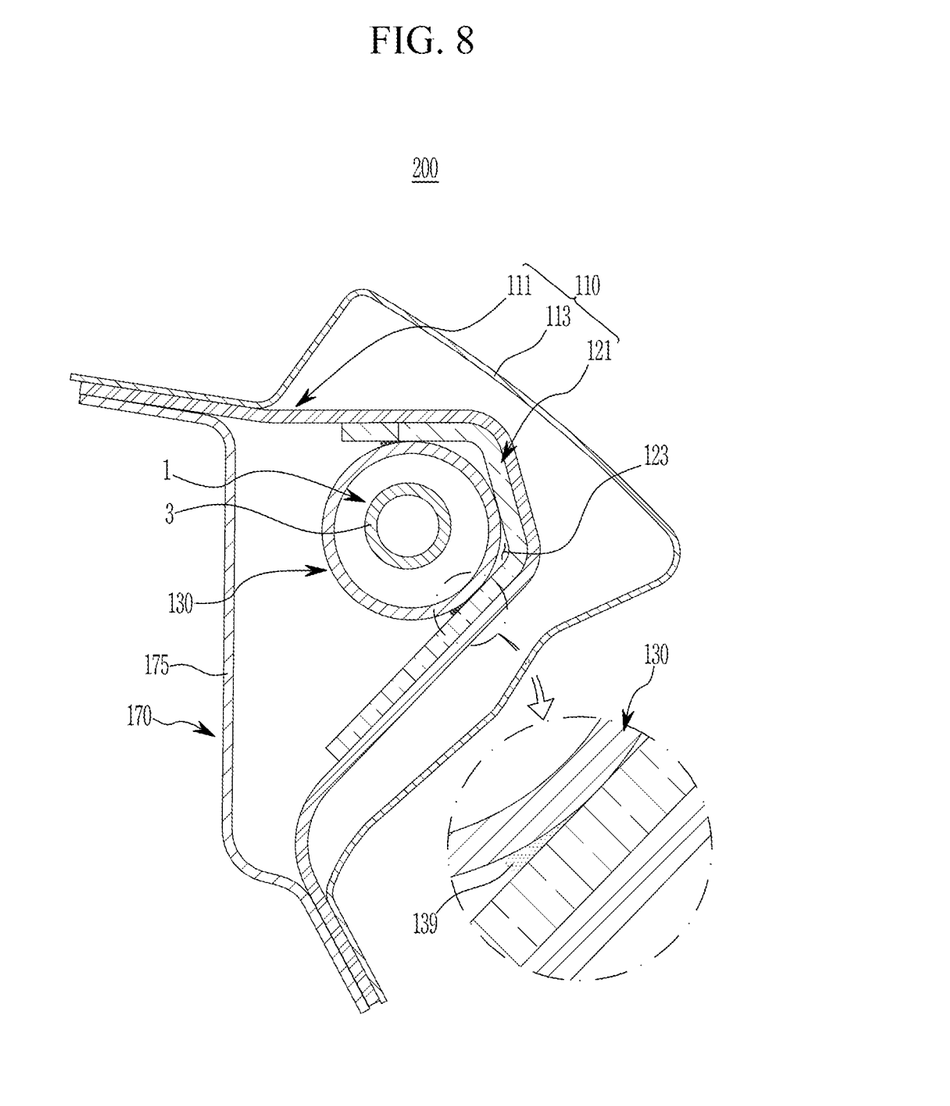
FIG. 8 is a cross-sectional view showing a front pillar structure according to another exemplary embodiment.

FIG. 8 is a cross-sectional view showing a front pillar structure according to another exemplary embodiment.

Referring to FIG. 8, a front pillar structure 200 according to another exemplary embodiment includes a side outer reinforce assembly 110 and a side inner panel assembly 170, similarly to the above-described exemplary embodiment.

Here, the side outer reinforce assembly 110 includes a front pillar outer reinforce member 111, a side outer panel 113, and a side outer reinforce member 121 that are joined with each other in the vehicle width direction. In addition, the side inner panel assembly 170 includes a front pillar inner panel 175 and a side inner panel 177 (refer to FIG. 1) that are joined with each other in the vehicle body length direction.

Furthermore, the front pillar structure 200 according to another exemplary embodiment includes a guide pipe 130 joined to an interior surface of the side outer reinforce member 121.

The guide pipe 130 is disposed in a mounting space 123 of the side outer reinforce member 121 and welded to the interior surface of the side outer reinforce member 121 along a length direction. That is, the guide pipe 130 directly contacts the interior surface of the side outer reinforce member 121 through a welding portion 139.

Therefore, according to the front pillar structure 200 according to another exemplary embodiment, the guide pipe 130 is directly connected to the interior surface of the side outer reinforce member 121, and thereby strength and small overlap collision performance of the pillar may be further improved.

Furthermore, according to the front pillar structure 200 according to another exemplary embodiment, a separate bracket for mounting the guide pipe 130 may be removed, thereby enabling weight reduction of the vehicle body.

Other configurations and operations of the front pillar structure 200 according to another exemplary embodiment are the same as the above-described exemplary embodiment, and may be clearly understood by the description above.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A front pillar structure of a vehicle, the front pillar structure being configured to mount a flexible component part having a preset length, the front pillar structure comprising:
   a side outer reinforce assembly;
   a guide pipe fixed to the side outer reinforce assembly, the guide pipe having open ends such that the flexible component part may enter in and be drawn out from the guide pipe; and
   a side inner panel assembly coupled to the side outer reinforce assembly interposing the guide pipe, the side inner panel assembly comprising an entering hole and a draw out hole that are connected to the open ends of the guide pipe, respectively.

2. The front pillar structure of claim 1, further comprising a mounting bracket coupled to the guide pipe and fixed to the side outer reinforce assembly and the side inner panel assembly.

3. The front pillar structure of claim 2, wherein the side outer reinforce assembly comprises:

a front pillar outer reinforce member coupled to the mounting bracket; and
a side outer reinforce member coupled to an interior surface of the front pillar outer reinforce member and configured to fix the guide pipe.

4. The front pillar structure of claim 2, wherein the side inner panel assembly comprises:
a front pillar inner panel coupled to the mounting bracket and to a front pillar outer reinforce member of the side outer reinforce assembly; and
a side inner panel coupled to the front pillar inner panel and the front pillar outer reinforce member.

5. The front pillar structure of claim 4, wherein:
the entering hole is provided on the front pillar inner panel; and
the draw out hole is provided on the side inner panel.

6. The front pillar structure of claim 4, wherein the mounting bracket comprises:
a first portion coupled to the guide pipe; and
a second portion extended from upper and lower sides of the first portion and coupled to the front pillar outer reinforce member and the front pillar inner panel.

7. The front pillar structure of claim 1, wherein the guide pipe comprises:
a straight range portion; and
a first bent range portion and a second bent range portion connected to both sides of the straight range portion, respectively.

8. The front pillar structure of claim 7, wherein:
the first bent range portion comprises a first open end connected to the entering hole; and
the second bent range portion comprises a second open end connected to the draw out hole.

9. The front pillar structure of claim 1, wherein the side outer reinforce assembly comprises:
a front pillar outer reinforce member; and
a side outer reinforce member coupled to an interior surface of the front pillar outer reinforce member and joined with the guide pipe.

10. The front pillar structure of claim 9, wherein the side inner panel assembly comprises:
a front pillar inner panel coupled to the front pillar outer reinforce member; and
a side inner panel coupled to the front pillar inner panel and the front pillar outer reinforce member.

11. The front pillar structure of claim 1, further comprising a foam pad layer affixed to an exterior surface of the guide pipe.

12. The front pillar structure of claim 1, wherein the flexible component part comprises a sensor cleaning hose configured to flow a washer liquid to clean a sensor installed in a roof of the vehicle.

13. A vehicle comprising:
a vehicle body;
a roof coupled to the vehicle body; and
a front pillar structure of the vehicle body, the front pillar structure comprising:
a side outer reinforce assembly;
a guide pipe fixed to the side outer reinforce assembly, the guide pipe having open ends such that a flexible component part may enter in and be drawn out from the guide pipe; and
a side inner panel assembly coupled to the side outer reinforce assembly interposing the guide pipe, the side inner panel assembly comprising an entering hole and a draw out hole that are connected to the open ends of the guide pipe, respectively.

14. The vehicle of claim 13, further comprising a mounting bracket coupled to the guide pipe and fixed to the side outer reinforce assembly and the side inner panel assembly.

15. The vehicle of claim 14, wherein the side outer reinforce assembly comprises:
a front pillar outer reinforce member coupled to the mounting bracket; and
a side outer reinforce member coupled to an interior surface of the front pillar outer reinforce member and configured to fix the guide pipe.

16. The vehicle of claim 14, wherein the side inner panel assembly comprises:
a front pillar inner panel coupled to the mounting bracket and to a front pillar outer reinforce member of the side outer reinforce assembly; and
a side inner panel coupled to the front pillar inner panel and the front pillar outer reinforce member.

17. The vehicle of claim 16, wherein:
the entering hole is provided on the front pillar inner panel; and
the draw out hole is provided on the side inner panel.

18. The vehicle of claim 16, wherein the mounting bracket comprises:
a first portion coupled to the guide pipe; and
a second portion extended from upper and lower sides of the first portion and coupled to the front pillar outer reinforce member and the front pillar inner panel.

19. The vehicle of claim 13, wherein the guide pipe comprises a straight range portion and a first bent range portion and a second bent range portion connected to both sides of the straight range portion, respectively, and wherein the first bent range portion comprises a first open end connected to the entering hole and the second bent range portion comprises a second open end connected to the draw out hole.

20. The vehicle of claim 13, wherein:
the side outer reinforce assembly comprises:
a front pillar outer reinforce member; and
a side outer reinforce member coupled to an interior surface of the front pillar outer reinforce member and joined with the guide pipe; and
the side inner panel assembly comprises:
a front pillar inner panel coupled to the front pillar outer reinforce member; and
a side inner panel coupled to the front pillar inner panel and the front pillar outer reinforce member.

* * * * *